(12) United States Patent
Buda et al.

(10) Patent No.: US 11,586,609 B2
(45) Date of Patent: Feb. 21, 2023

(54) ABNORMAL EVENT ANALYSIS

(71) Applicants: INTERNATIONAL BUSINESS MACHINES CORPORATION, Armonk, NY (US); UNIVERSITY COLLEGE DUBLIN, Dublin (IE)

(72) Inventors: Teodora Sandra Buda, Dublin (IE); Hitham Ahmed Assem Aly Salama, Dublin (IE); Bora Caglayan, Dublin (IE); Faisal Ghaffar, Dunboyne (IE); Andres Omar Portillo Dominguez, Dublin (IE); Shane Brady, Bray (IE); Magdalena Kacmajor, Kells (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 11 days.

(21) Appl. No.: 17/020,855

(22) Filed: Sep. 15, 2020

(65) Prior Publication Data
US 2022/0083531 A1   Mar. 17, 2022

(51) Int. Cl.
G06F 16/00 (2019.01)
G06F 16/23 (2019.01)
(Continued)

(52) U.S. Cl.
CPC .......... *G06F 16/2365* (2019.01); *G06F 16/29* (2019.01); *G06N 3/04* (2013.01); *G06N 3/08* (2013.01)

(58) Field of Classification Search
CPC ....... G06F 16/2365; G06F 16/29; G06N 3/08; G06N 3/04; G06N 20/00; G06Q 10/0635;
(Continued)

(56) References Cited

U.S. PATENT DOCUMENTS 8,887,286 B2  11/2014 Dupont
9,043,329 B1   5/2015 Patton
(Continued)

FOREIGN PATENT DOCUMENTS

CN    108027888 A    5/2018
WO    2017048585 A1  3/2017

OTHER PUBLICATIONS

Atefeh et al., "A Survey of Techniques for Event Detection in Twitter," Computational Intelligence, vol. 0, No. 0, 2013, http://rali.iro.umontreal.ca/rali/sites/default/files/publis/Atefeh_et_al-2013-Computational_Intelligence-2.pdf, 33 pages.
(Continued)

*Primary Examiner* — Dinku W Gebresenbet
(74) *Attorney, Agent, or Firm* — Robert R. Aragona

(57) ABSTRACT

An embodiment for contextualizing abnormal events which employ location-based social networks, LBSN, data to determine events that may be linked to the abnormal events is provided. The embodiment may include detecting an occurrence of an abnormal event within a geographic region, wherein the abnormal event occurs at an occurrence time. The embodiment may also include obtaining location-based social networks, LBSN, data relating to the geographic region for a time period including the occurrence time. The embodiment may further include analyzing the obtained LBSN data, wherein the analyzation determines a linked event within the geographic region for the time period. The embodiment may also include associating the linked event with the abnormal event.

16 Claims, 8 Drawing Sheets

(51) Int. Cl.
  *G06N 3/08*   (2023.01)
  *G06N 3/04*   (2023.01)
  *G06F 16/29*  (2019.01)

(58) Field of Classification Search
  CPC ............. G06Q 30/018; G06Q 30/0225; G06Q 30/0609; G06Q 40/08; G06Q 50/26; G06Q 50/00; H04L 51/222; H04L 51/52; H04L 67/535; H04W 4/021; H04W 4/21
  See application file for complete search history.

(56) References Cited

U.S. PATENT DOCUMENTS

| | | | |
|---|---|---|---|
| 9,319,421 B2 | 4/2016 | Ferragut | |
| 9,740,940 B2 | 8/2017 | Chattopadhyay | |
| 2017/0076217 A1* | 3/2017 | Krumm | G06N 20/00 |
| 2017/0299424 A1* | 10/2017 | Zheng | G01H 3/10 |
| 2018/0189664 A1* | 7/2018 | Hegde | G06F 9/542 |
| 2019/0122229 A1* | 4/2019 | Buda | G06N 5/046 |

OTHER PUBLICATIONS

Belkaroui et al., "User-Tweet Interaction Model and Social Users Interactions for Tweet Contextualization," Computational Collective Intelligence. Springer, Cham, 2015, pp. 144-157.

Bridges et al., "Multi-Level Anomaly Detection on Time-Varying Graph Data," 2015 IEEE/ACM International Conference on Advances in Social Networks Analysis and Mining, DOI: http://dx.doi.org/10.1145/2808797.2809406, pp. 579-583.

Redondo Garcia et al., "Describing and Contextualizing Events in TV News Show," Proceedings of the 23rd International Conference on World Wide Web. ACM, Apr. 2014, https://doi.org/10.1145/2567948.2579326, pp. 759-764.

Mell et al., "The NIST Definition of Cloud Computing", National Institute of Standards and Technology, Special Publication 800-145, Sep. 2011, 7 pages.

Pan et al., "Crowd Sensing of Traffic Anomalies based on Human Mobility and Social Media," SIGSPATIAL GIS '13, Nov. 5-8, 2013, https://infolab.usc.edu/DocsDemos/Penny_GIS13.pdf, 10 pages.

Thom et al., "Spatiotemporal Anomaly Detection through Visual Analysis of Geolocated Twitter Messages," IEEE Pacific Visualization Symposium, Apr. 16, 2012, https://www.scatterblogs.com/wp-content/uploads/2015/02/TAGMAP_thom2012spatiotemporal.pdfpp. 41-48.

Weng et al., "Event Detection in Twitter," Proceedings of the Fifth International AAAI Conference on Weblogs and Social Media, 2011, https://www.semanticscholar.org/paper/Event-Detection-in-Twitter-Weng-Lee/d0b99e208dfa48b06ae1c54e0fc1e1dacb34f617, pp. 401-408.

Wienhofen et al., "Enriching events to support hospital care," Proceedings of the 7th Middleware Doctoral Symposium. ACM, Nov. 2010, https://doi.org/10.1145/1891748.1891753, pp. 26-30.

* cited by examiner

ABNORMAL EVENT ANALYSIS

BACKGROUND

The present invention relates to abnormal events, and more particularly, to concepts contextualizing and/or classifying abnormal events. The present invention further relates to a computer program product comprising computer-readable program code that enables a processor of a processing system to implement such a method. The present invention further relates to a system for contextualizing an abnormal event.

Identifying abnormal events (i.e., anomaly detection) typically involves identifying events or patterns that deviate from an expected behavior. It is useful in a variety of applications, such as fraud detection for banking and financial industries, intrusion and anomalous traffic pattern detection for cyber-security, and performance degradation for network management.

Abnormal event detection techniques typically try to strike a balance between excessive/high sensitivity, which can result in false positives (i.e., incorrectly reporting a normal or expected event as an abnormal event), and insufficient/low sensitivity, which can result in false negatives (i.e., failure to detect or identify an abnormal event). Once such exemplary detection technique involves comparing an identified deviation (e.g., between an actual value and an expected value) against a threshold. However, this approach simply identifies potentially abnormal events and requires the threshold value to be appropriately defined in consideration of the opposing impacts of excessive and insufficient sensitivity. This can be particularly difficult when needing to cater for differing situations, conditions or considerations.

SUMMARY

According to one embodiment, a method, computer system, and computer program product for contextualizing an abnormal event for improved discovery of abnormal events and/or improved understanding of what may have caused an abnormal event is provided. The present invention also seeks to provide methods for generating data for abnormal event classification and for classifying an abnormal event. Such methods may be computer-implemented. The present invention further seeks to provide a computer program product including computer program code for implementing the proposed concepts when executed on a processor. The present invention yet further seeks to provide a system for contextualizing an abnormal event.

According to an embodiment of the present invention there is provided a method for contextualizing an abnormal event. The embodiment may include detecting the occurrence of an abnormal event within a geographic region, the abnormal event occurring at an occurrence time. The embodiment may also include obtaining location-based social networks, LBSN, data relating to the geographic region for a time period including the occurrence time. The embodiment may further include analyzing the obtained LBSN data to determine a linked event within the geographic region for the time period. The embodiment may also include associating the linked event with the abnormal event.

According to another aspect of the invention, there is provided a method for generating data for abnormal event classification. The method comprises, for a plurality of abnormal events within a geographic region, contextualizing the abnormal event according to a proposed embodiment. The method also comprises, for each of the plurality of abnormal events, storing information relating to its associated linked event.

According to yet another aspect of the invention, there is provided a method for classifying an abnormal event. The method comprises detecting the occurrence of an abnormal event within a geographic region. The method also comprises classifying the abnormal event based on data for abnormal event classification generated according to a proposed embodiment.

Embodiments may be employed in combination with conventional/existing event detection and analysis systems. In this way, embodiments may integrate into legacy systems so as to improve and/or extend their functionality and capabilities. An improved anomaly detection system may therefore be provided by proposed embodiments.

According to another embodiment of the present invention, there is provided a computer program product for contextualizing an abnormal event, the computer program product comprising a computer readable storage medium having program instructions embodied therewith, the program instructions executable by a processing unit to cause the processing unit to perform a method according to one or more proposed embodiments when executed on at least one processor of a data processing system.

According to another embodiment of the present invention, there is provided a computer program product for generating data for abnormal event classification, the computer program product comprising a computer readable storage medium having program instructions embodied therewith, the program instructions executable by a processing unit to cause the processing unit to perform a method according to one or more proposed embodiments when executed on at least one processor of a data processing system.

According to yet another aspect, there is provided a processing system comprising at least one processor and the computer program product according to one or more embodiments, wherein the at least one processor is adapted to execute the computer program code of said computer program product.

According to another aspect, there is provided a system for contextualizing an abnormal event. The system comprises a detection component configured to detect the occurrence of an abnormal event within a geographic region, the abnormal event occurring at an occurrence time. The system also comprises an interface component configured to obtain LBSN data relating to the geographic region for a time period including the occurrence time. The system further comprises a data analysis component configured to analyze the obtained LBSN data to determine a linked event within the geographic region for the time period. The system yet further comprises a mapping component configured to associate the linked event with the abnormal event.

Thus, there may be proposed a concept for contextualizing an abnormal event by leveraging LBSN data (i.e., social media data). For instance, such a concept may identify one or more reasons behind abnormal events (i.e., anomalies) and contextualize the abnormal events automatically as they occur (e.g., in real time).

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
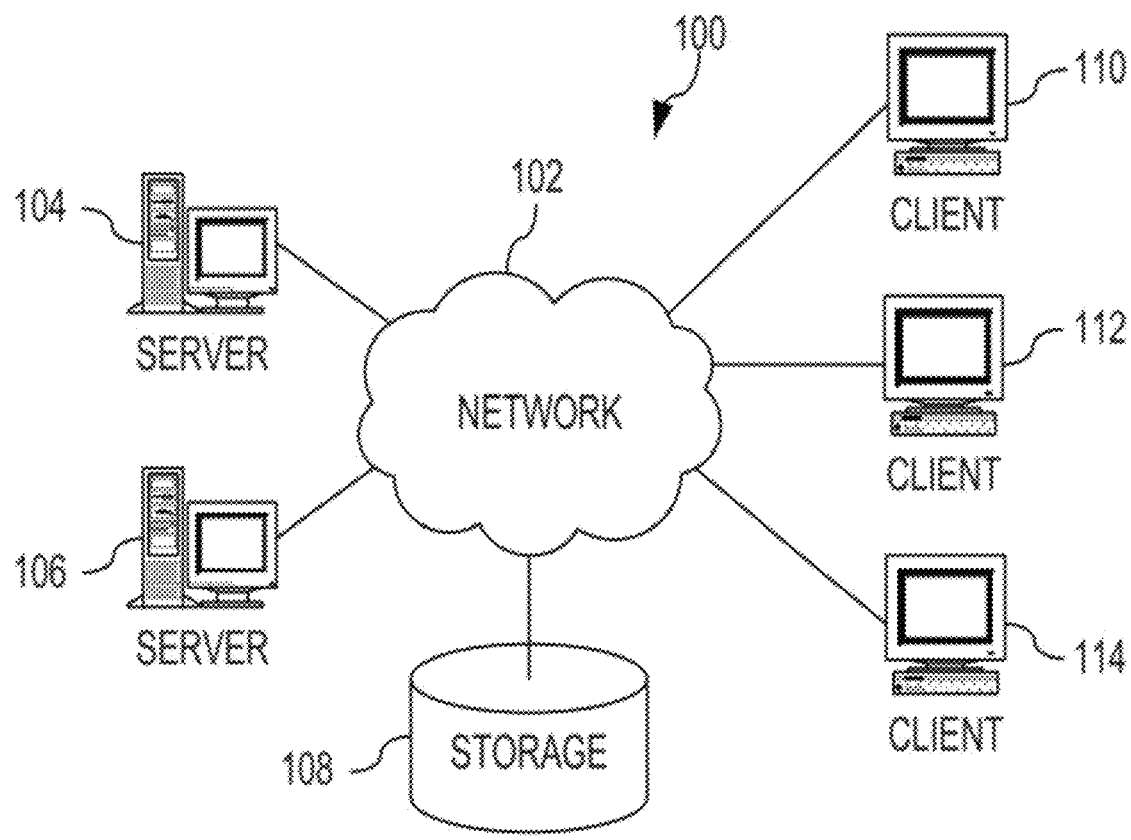
FIG. 1 depicts a pictorial representation of an example distributed system in which aspects of the illustrative embodiments may be implemented.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e., is a computer-implementable method. The various steps of the method therefore reflect various parts of a computer program, e.g., various parts of one or more algorithms.

Also, in the context of the present application, a (processing) system may be a single device or a collection of distributed devices that are adapted to execute one or more embodiments of the methods of the present invention. For example, a system may be a personal computer (PC), a server or a collection of PCs and/or servers connected via a network such as a local area network, the Internet and so on to cooperatively execute at least one embodiment of the methods of the present invention.

Also, in the context of the present application, a system may be a single device or a collection of distributed devices that are adapted to execute one or more embodiments of the methods of the present invention. For instance, a system may be a personal computer (PC), a portable computing device (such as a tablet computer, laptop, smartphone, etc.), a set-top box, a server or a collection of PCs and/or servers connected via a network such as a local area network, the Internet and so on to cooperatively execute at least one embodiment of the methods of the present invention.

Proposed are concepts for contextualizing abnormal events which employ location-based social networks, LBSN, data to determine events that may be linked to the abnormal events. Events that are determined to be linked to an abnormal event may provide information that be used to account for a context, e.g. through associating event location to expected patterns, occurrences and/or patterns.

Reference to an abnormal event should be taken to refer to an event (or pattern of events) that deviates from an expectation. For example, an event may comprise behavior of one or more persons in a particular geographic area. Such an event may be abnormal in that it has not occurred before, has not occurred for a long time, or does not occur more than once in a predetermined length of time (e.g., a day, week, month or year).

Also, reference to LBSN data should be taken to refer to data generated by LBSNs and which comprises information about a user's activity at one or more locations, such as geo-tagged activity data. Such data empowers users to share their activity-related choices using their social network. LBSN data not only comprises information about geographical coordinates of a user or user action, but also the user's activity at the geographical location. LSBN data are generated by millions of people from different countries throughout the world and, as the number of social network users grows, so does the amount, quality and usability of data. The information contained in LBSN data enables the exploration of intangible aspects of urban life that are linked to locations. Some social exchanges and events happening at a location may remain concealed in some cases. However, these exchanges leave a virtual trail linked to a specific location, which provides more information about users' experiences and perceptions of the city. LBSN data can be thought of as Volunteered Geographic Information (VGI) since the expressed perceptions, interests, needs and behaviors are published online voluntarily by the users and refer to unique and specific places/locations. LBSN data is generally collected "unobtrusively" and users are generally not constrained when generating information. This is an advantage because, according to the Hawthorne effect, subjects may alter their behavior in a study on realizing that they are being observed.

Lastly, the diversity of LBSNs, and the content retrieved from them, offer a multi-perspective approach to the study of cities. There is considerable research using data from some of the most globally-renowned LBSNs that covers different topics in relation to diverse fields of knowledge. However, other LBSNs, such as Foursquare™ (Foursquare and all Foursquare-based trademarks and logos are trademarks or registered trademarks of Foursquare Labs, Inc. and/or its affiliates) and Google Places' (Google Places and all Google Places-based trademarks and logos are trademarks or registered trademarks of Google LLC and/or its affiliates) have demonstrated their relevance as supplementary georeferenced data sources. Moreover, different LBSNs, with the same functionality as the renowned global ones, are more commonly used in specific geographical areas. Thus, methods developed for collecting and analyzing LBSN data for research purposes can be transferrable to other LBSNs.

Proposed is a concept of contextualizing abnormal events, and, if no relevant context for a detected abnormal event is discovered, that event may be identified as a false positive and then ignored or filtered out. Such proposed contextualization may leverage external social media data from LBSNs. The inventors have realized that, because LBSNs not only report the geographical coordinates of a user but also the user's activity in the geographical location/area/region of the user, such data can be useful for reasoning behind detected abnormal events in that geographical location/area/region.

Furthermore, training a model that is able to learn which type of event is related to a detected abnormal event may provide information that can be used to automatically obtain the reason behind a detected abnormal event without the aid of external data.

By way of example, according to a proposed concept, there may be provided an approach to contextualizing an abnormal event based on machine-learning for reasoning behind abnormal events. For example, anomaly detection may be combined with topic modeling for contextualizing detected abnormal events. By leveraging social media data, event detection within the social media data may be used for contextualizing abnormal events. Further, such contextualization may provide data that can be used to train a model for classifying detected events. In this way, proposed embodiments may be used to generate information for the model that can subsequently be used to automatically contextualize a detected abnormal event without the use of LBSN data.

According to a proposed concept, an exemplary approach may firstly leverage anomaly detection techniques for detecting an abnormal event in a geographical area/region. Events that occurred/happened during or around the time of the abnormal event may then be extracted from LBSN data. By analyzing the events extracted from the LBSN data and abnormal event, it may then be identified whether there is a relationship between the occurrence of the abnormal event and any of the events extracted from the LBSN data. Further, embodiments may be used to train a model that learns which type of event(s) is/are associated to abnormal events. In this way, a model may be generated which can be used to directly classifier reasoning behind detected abnormal events without the use of LBSN data.

A first exemplary application of a proposed embodiment may be as follows: For an operator, a wide range of monitoring data may be available from an urban region. One such example is the throughput at a geographic location over time. By applying conventional abnormal event detection techniques, an embodiment may extract abnormal users' throughput utilization in an urban area, such as Manhattan for example. Furthermore, through LBSN, such as the tweets in the urban area during the same period of time, an event detection technique can be used to contextualize the abnormal throughput usage detected by providing information about an event happening in the region at that time (e.g., abnormal mobile data usage during a concert).

A second exemplary application of a proposed embodiment may be as follows: For a law enforcement agency, monitoring urban areas is an important activity. Extracting abnormal events or patterns, such as abnormal crowd count or traffic, can therefore be beneficial. An abnormal event detection technique on the number of people at a geographic location with respect to time may be used to detect abnormal crowd patterns. Further, LBSN data, such as tweets and social media status updates, may be extracted for the same time period to provide information useful for identifying a reason behind the abnormal crowd pattern(s). For example, a disturbance may be detected in the region, and this may be linked with a topic of discussion on social media. Such information can be further leveraged to delegate the distress call to the appropriate police department.

Proposed are concepts for identifying the reasoning behind abnormal events or patterns. Using such concepts, embodiments may facilitate improved abnormal event detection that has high sensitivity to abnormal events whilst also being less prone to providing false positives (i.e., having increased accuracy).

Exemplary embodiments may comprise four main components:

(I) Anomaly Detection: Abnormal patterns may be detected for a chosen time interval for a certain geographical area. This may employ known or conventional anomaly detection techniques.

(II) Event Detection: After detecting an abnormal pattern (i.e. a potential abnormal event or 'abnormal event candidate', events may be extracted from LBSN data gathered in the same geographical area for the same time interval. This may therefore leverage social media repositories. For example, such event detection from LBSN data may employ techniques (such as pyMABED from Treets) that are based on topic modeling and return popular topics during the time interval.

(III) Contextualization and validation: The events detected in (II) may be used for contextualizing the anomalies detected in (I). This may help provide an understanding of why a certain abnormal pattern occurred. In addition, this may be used to filter out false positives detected by the anomaly detection technique. For example, if there is no event of interest detected in the region of interest in (II), it may be inferred that the abnormal pattern detected is either a false positive or not of interest to the user. The anomaly may thus be filtered out and not reported.

(IV) Classifier: A dataset may be constructed based on the acquired information from (I) and (II). For example, the following variables may be collected over the time interval when abnormal events are detected: the initial patterns, such as crowd count, throughput value, geographic location, etc. from (I) and the event types extracted from (II) (e.g., concert, disturbance, traffic jam). The events can be particularized for the use case (e.g., operators, LEA). Using such information, an event classifier may be trained that is able to automatically classify a detected anomaly. Such a classifier may be leveraged for future abnormal patterns detection without the use of event detectors and LBSN data, since the events information may be used as a target variable and learnt over time in order to identify one or more reasons behind abnormal patterns that are detected.

FIG. 1 depicts a pictorial representation of an exemplary distributed system in which aspects of the illustrative embodiments may be implemented. A distributed system 100 may include a network of computers in which aspects of the illustrative embodiments may be implemented. The distributed system 100 may contain at least one network 102, which is the medium used to provide communication links between various devices and computers connected together within the distributed data processing system 100. The network 102 may include connections, such as wire, wireless communication links, or fiber optic cables.

In the depicted example, first 104 and second 106 servers may be connected to the network 102 along with a storage unit 108. In addition, clients 110, 112, and 114 may also be connected to the network 102. The clients 110, 112, and 114 may be edge devices, for example, personal computers, network computers, IoT devices, or the like. In the depicted example, the first server 104 may provide data, such as boot files, operating system images, and applications to the clients 110, 112, and 114. Clients 110, 112, and 114 may be clients to the first server 104 in the depicted example. The distributed processing system 100 may include additional servers, clients, and other devices not shown.

In the depicted example, the distributed system 100 may be the Internet with the network 102 representing a worldwide collection of networks and gateways that use the Transmission Control Protocol/Internet Protocol (TCP/IP) suite of protocols to communicate with one another. At the heart of the Internet may be a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
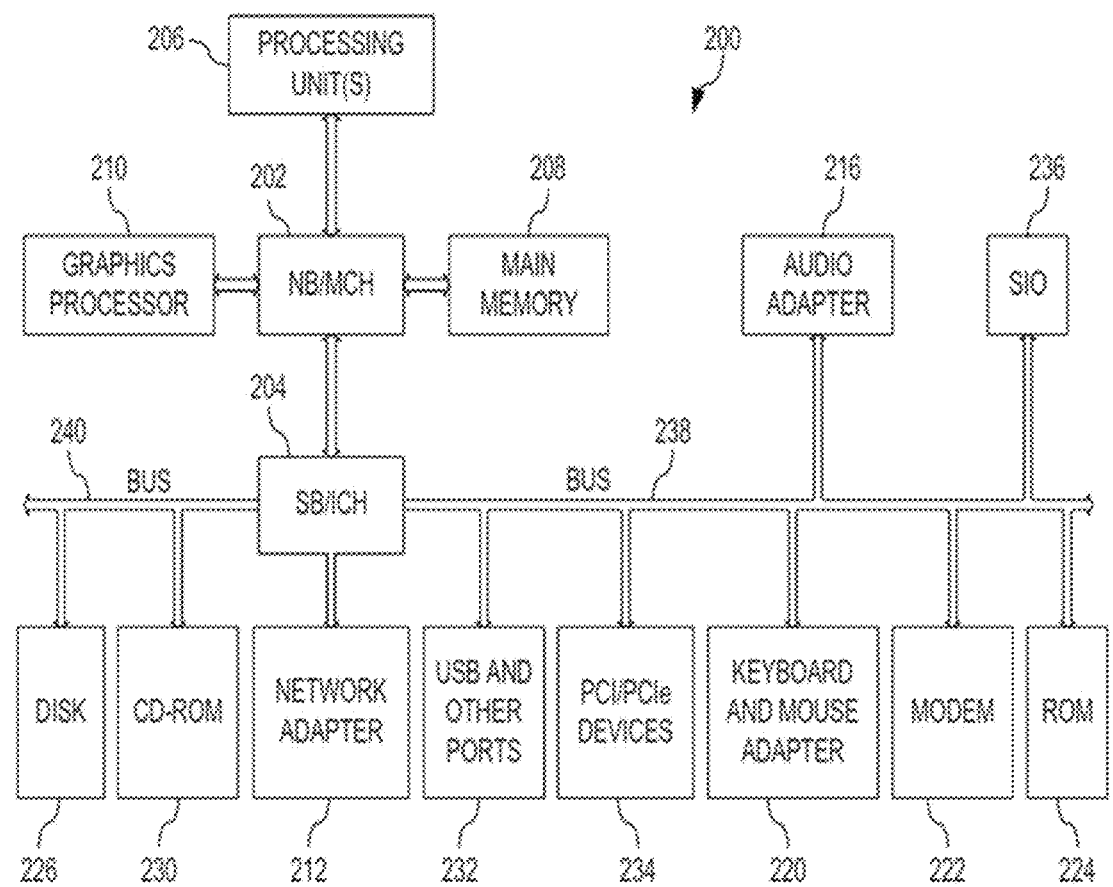
FIG. 2 is a block diagram of an example system in which aspects of the illustrative embodiments may be implemented.

FIG. 2 is a block diagram of an example system 200 in which aspects of the illustrative embodiments may be implemented. The system 200 may be an example of a computer, such as client 110 in FIG. 1, in which computer usable code or instructions implementing the processes for illustrative embodiments of the present invention may be located. For instance, a proposed embodiment may be partly implemented in a processing unit 206 of the system 200.

In the depicted example, the system 200 may employ a hub architecture including a north bridge and memory controller hub (NB/MCH) 202 and a south bridge and input/output (I/O) controller hub (SB/ICH) 204. Thus, another proposed embodiment may be implemented in the memory controller hub 202 of the system 200. A processing unit 206, a main memory 208, and a graphics processor 210 may be connected to NB/MCH 202. The graphics processor 210 may be connected to the NB/MCH 202 through an accelerated graphics port (AGP).

In the depicted example, a local area network (LAN) adapter 212 may connect to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) port and other communication ports 232, and PCI/PCIe devices 234 may connect to the SB/ICH 204 through first bus 238 and second bus 240. PCI/PCIe devices may include, for example, Ethernet adapters, add-in cards, and PC cards for notebook computers. PCI may use a card bus controller, while PCIe does not. ROM 224 may be, for example, a flash basic input/output system (BIOS).

The HDD 226 and CD-ROM drive 230 may connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system may run on the processing unit 206. The operating system may coordinate and provide control of various components within the system 200 in FIG. 2. As a client, the operating system may be a commercially available operating system. An object-oriented programming system, such as the Java™ (Java and all Java-based trademarks and logos are trademarks or registered trademarks of Oracle, Inc. and/or its affiliates) programming system, may run in conjunction with the operating system and provide calls to the operating system from Java™ programs or applications executing on the system 200.

As a server, system 200 may be, for example, an IBM® (IBM and all IBM-based trademarks and logos are trademarks or registered trademarks of IBM, Inc. and/or its affiliates) eServer™ (eServer and all eServer-based trademarks and logos are trademarks or registered trademarks of IBM, Inc. and/or its affiliates) System p5® (System p5 and all System p5-based trademarks and logos are trademarks or registered trademarks of IBM, Inc. and/or its affiliates) computer system, running the Advanced Interactive Executive (AIX®) (AIX and all AIX-based trademarks and logos are trademarks or registered trademarks of IBM, Inc. and/or its affiliates) operating system or the LINUX® (LINUX and all LINUX-based trademarks and logos are trademarks or registered trademarks of Linus Torvalds and/or its affiliates) operating system. The system 200 may be a symmetric multiprocessor (SMP) system including a plurality of processors in processing unit 206. Alternatively, a single processor system may be employed.

Instructions for the operating system, the programming system, and applications or programs may be located on storage devices, such as HDD 226, and may be loaded into main memory 208 for execution by processing unit 206. Similarly, one or more programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Figure 3:
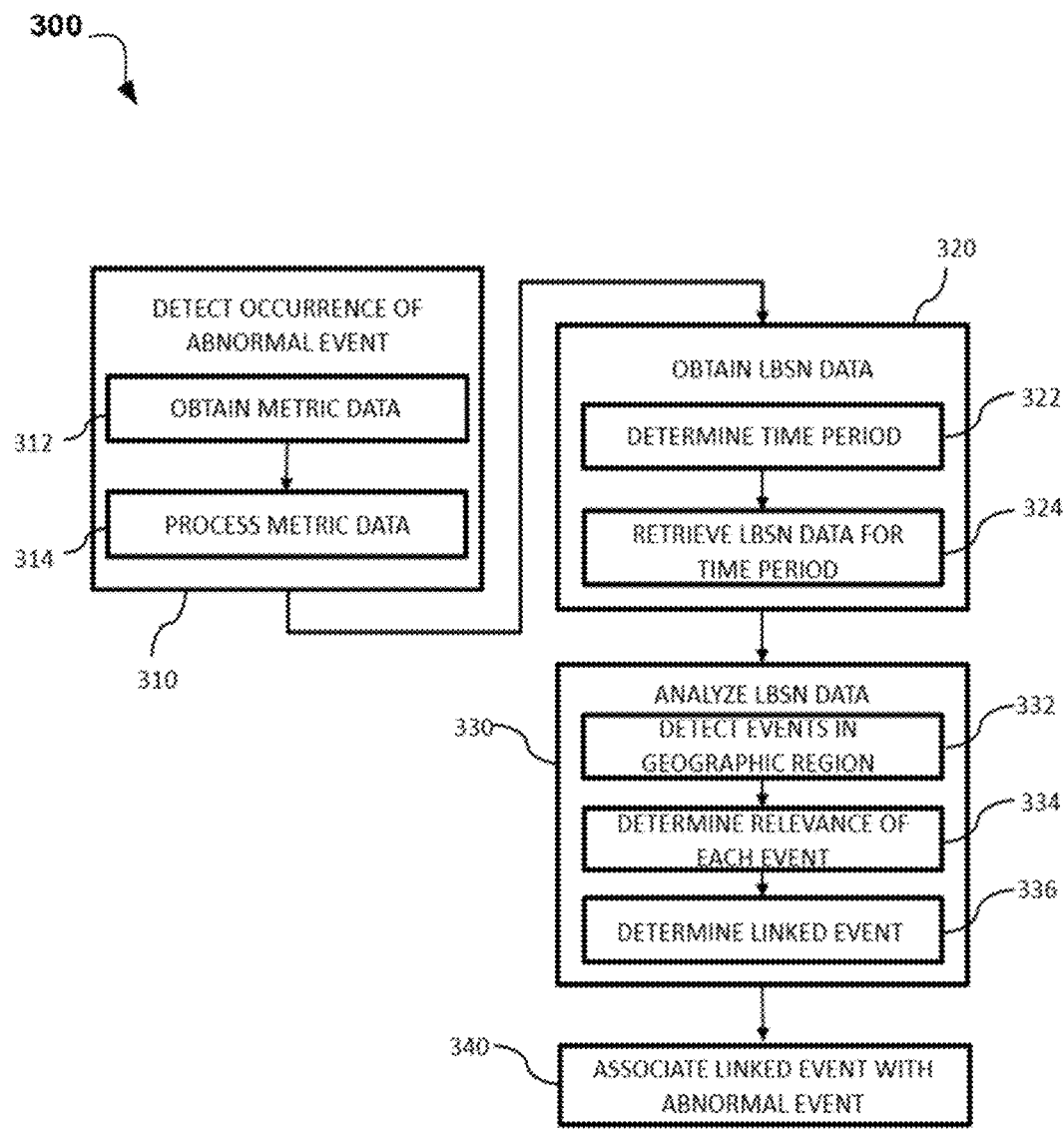
FIG. 3 depicts a flow diagram of a method for contextualizing an abnormal event according to an embodiment of the present invention.

Referring to FIG. 3, there is depicted a flow diagram of a method for contextualizing an abnormal event.

The method begins with the step 310 of detecting the occurrence of an abnormal event within a geographic region, the abnormal event occurring at an occurrence time. Here, step 310 may comprise two main stages 312 and 314. Stage 312 comprises obtaining metric data relating to a monitored metric of the geographic region. Stage 314 comprises processing the metric data with an anomaly detection algorithm to detect the occurrence of an abnormal event. In this example, processing the metric data with an anomaly detection algorithm to detect the occurrence of an abnormal event may comprise: determining, from the metric data, a first value of the monitored metric at first point in time; determining an expected value of the monitored metric at the first point in time; and detecting the occurrence of an abnormal event at the first point in time, based on the first and expected values of the monitored metric at the first point in time. For example, determining an expected value of the monitored metric at the first point in time comprises calculating an expected value using at least one of: a time series forecasting model; and a machine-learning model.

The method then proceeds to step 320 of obtaining LBSN data relating to the geographic region for a time period including the occurrence time. Specifically, in this example, step 320 obtaining LBSN data relating to the geographic region may comprise: step 322 of determining, based on the detected occurrence of an abnormal event, a time period including the occurrence time; and step 324 of retrieving, from one or more databases, LBSN data relating to the geographic region for the determined time period.

The LBSN data is then analyzed in step 330. Specifically, step 330 may comprise analyzing the obtained LBSN data to determine a linked event within the geographic region for the time period. Here, analyzing the obtained LBSN data to determine a linked event within the geographic region for the time period may comprise step 332 detecting one or more events within the geographic region based on the obtained LBSN data. More specifically, step 332 of detecting one or more events within the geographic region based on the obtained LBSN data may comprise: processing the obtained LSBN data with a topic-modelling algorithm to identify popular topics for the time period; determining a measure of relevance of each of the popular topics; and determining one or more events based on the determined measure of relevance for each of the popular topics.

Step 330 of Analyzing the obtained LBSN data, may then further comprise: step 334 of determining a measure of relevance of each of the detected one or more events; and step 336 of determining a linked event based on the determined measure of relevance for each of the detected one or more events.

Finally, in step 340, the linked event is associated with the abnormal event.

In another example, step 336 of determining a linked event may comprise, responsive to the determined measure of relevance for each of the detected one or more events not exceeding a predetermined threshold, determining that there is no linked event. In such a circumstance, the method may further comprise, responsive to determining that there is no linked event, identifying that the detected occurrence of an abnormal event is erroneous.

It will be appreciated that, by associating an event extracted from LBSN data with the abnormal event, a context may be provided for the abnormal event. In other words, the abnormal event may be considered to be contextualized, and the context may be that of an event which was present or occurred/occurring at the time of the abnormal event. Embodiments may thus provide information or data that is useful for classifying abnormal events.

For example, according to a proposed concept, there may be provided a method for generating data for abnormal event classification. Such a method comprises, for each of a plurality of abnormal events within a geographic region, contextualizing the abnormal event according to a proposed embodiment (such as that depicted in FIG. 3). Then, for each of the plurality of abnormal events, information relating to its associated linked event may be stored (e.g., in a database, lookup table or structure data repository).

Further, the generated data may be employed for the purpose of classifying an abnormal event. For example, a detected abnormal event may be automatically classified (e.g., as a false positive). Thus, a proposed embodiment may provide a computer-implemented method for classifying an abnormal event, the method comprising: detecting the occurrence of an abnormal event within a geographic region; and classifying the abnormal event based on data for abnormal event classification generated according to a proposed embodiment.

Figure 4:
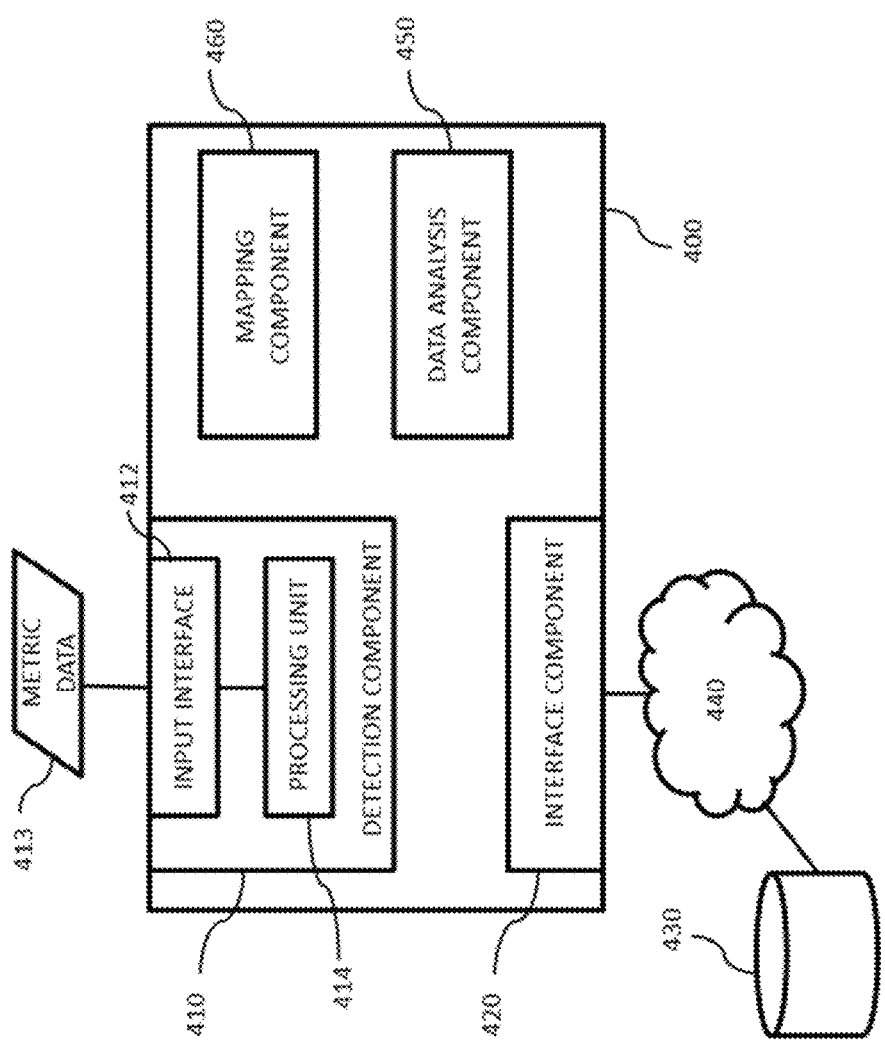
FIG. 4 is a simplified block diagram of a proposed system according to an embodiment of the present invention.

Referring to FIG. 4, there is depicted a schematic diagram of a proposed system according to an embodiment. The system 400 may be configured to contextualize an abnormal event.

The system may comprise a detection component 410 that may be configured to detect the occurrence of an abnormal event within a geographic region, the abnormal event occurring at an occurrence time. Specifically, the detection component 410 may comprise an input interface 412 and a processing unit 414. The input interface 412 may be configured to obtain metric data 413 relating to a monitored metric of the geographic region. The processing unit 414 may then processes the metric data with an anomaly detection algorithm to detect the occurrence of an abnormal event.

The system 400 may also comprise an interface component 420 that may be configured to obtain LBSN data relating to the geographic region for a time period including the occurrence time. In this example, the interface component 420 may retrieve the LBSN data from a remotely located database 430 via the Internet 440. For this, interface component 420 may determine a time period including the time at which the detected abnormal event occurred, and may then retrieve, from the database 430, LBSN data relating to the geographic region for the determined time period.

A data analysis component 450 of the system 400 may be configured to analyze the obtained LBSN data to determine a linked event within the geographic region for the time period. For example, the data analysis component 450 may be configured to: detect one or more events within the geographic region based on the obtained LBSN data; determine a measure of relevance of each of the detected one or more events; and determine a linked event based on the determined measure of relevance for each of the detected one or more events.

The system 400 may further comprise a mapping component 460 that may be configured to associate the linked event with the abnormal event.

Figure 5:
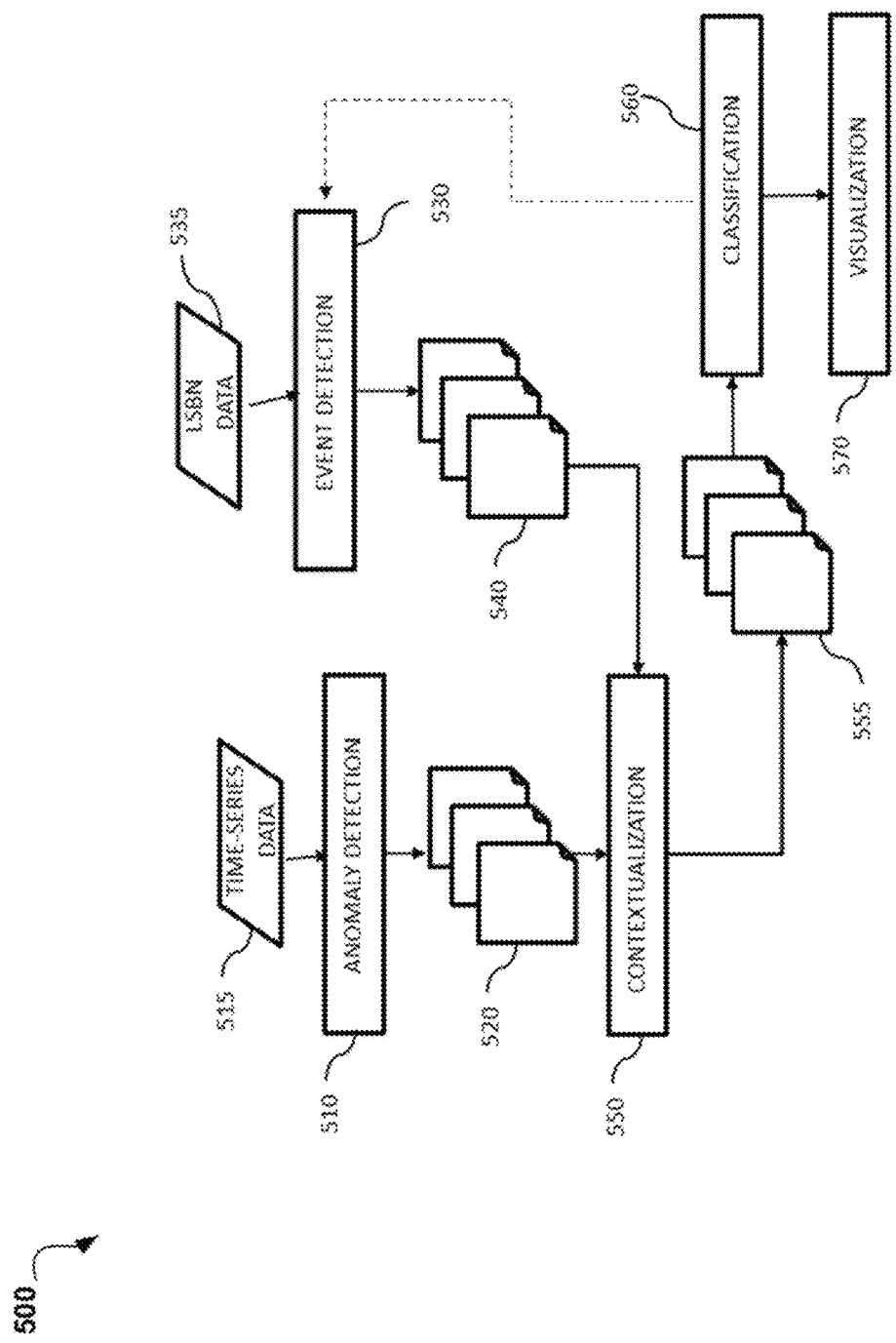
FIG. 5 depicts a method for contextualizing an abnormal event according to another embodiment of the present invention.
Figure 6:
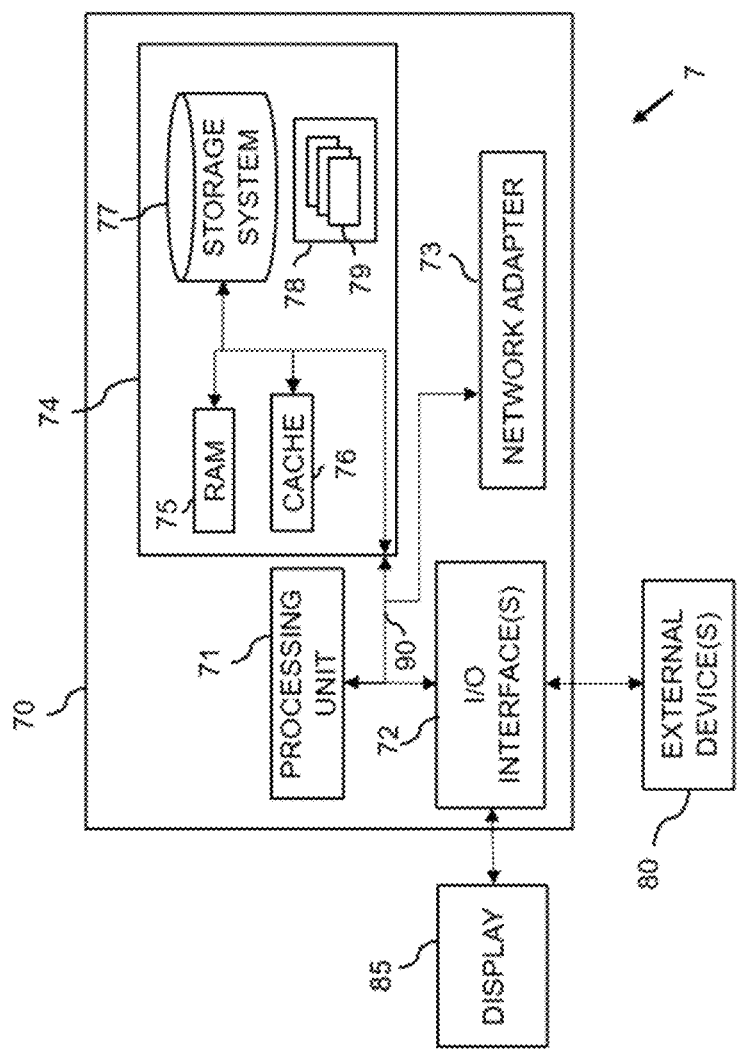
FIG. 6 illustrates a system according to another embodiment of the present invention.

By way of further illustration, FIG. 5 illustrates a proposed embodiment which comprises the following five main stages:

Stage I—Anomaly Detection 510

Here, an anomaly detection technique may be applied to monitored time-series data 515. In this example, the approach for anomaly detection may be based on measuring a deviation between the actual and expected values of the monitored metric(s), wherein the expected value is calculated by leveraging either: a time series forecasting model (e.g., ARIMA, Holt winters); or a machine learning model (e.g., LSTM). Such an approach for anomaly detection can be applied to any dataset that represents a reasonable spatial-temporal distribution in a certain geographical area. One or more detected anomalies 520 may be provided by this stage.

Stage II—Events Detection 530

LBSN data 535 may be gathered from LBSNs on a city-wide scale. This may capture large-scale user activity for a particular city during the time period during which the anomalies were detected in Stage I. A topic-modelling based approach may be used in event extraction for the time period during which the anomalies occurred. Here, a list of the most popular topics may be extracted as relevant topics corresponding to the abnormal behavior is detected. From this, events that are irrelevant may be filtered/removed (e.g., various topics can be deemed popular such as Good Morning New York although not related to an actual event). This stage may leverage the classifier (from Step 4 below) once it is trained, instead of the LBSN Data and Event Detection.

Stage III—Contextualization and Validation 550

Based on the events reported from Stage II above, the abnormal patterns may be detected at Stage I by mapping them to the corresponding event. Furthermore, if there is no event of interest related to the abnormal pattern detected, the anomaly may be filtered/ignored as it is deemed of no interest and represents a false positive.

Stage IV—Classification 560

A dataset may be built containing the detected abnormal patterns and corresponding events. This dataset may be used to train a classifier that is able to inform the type of event automatically when detecting an abnormal pattern.

Stage V—Visualization 570

Detected abnormal patterns and associated events may be visually represented (e.g., (graphically displaying the associations)).

By way of yet another example, embodiments may comprise a computer system 70, which may form part of a networked system 7 illustrated in FIG. 5. For instance, a detection component configured to detect the occurrence of an abnormal event within a geographic region may be implemented in the computer system 70 (e.g. as a processing unit 71). The components of computer system/server 70 may include, but are not limited to, one or more processing arrangements, for example comprising processors or processing units 71, a system memory 74, and a bus 90 that couples various system components including system memory 74 to processing unit 71.

System memory 74 may include computer system readable media in the form of volatile memory, such as random access memory (RAM) 75 and/or cache memory 76. Computer system/server 70 may further include other removable/non-removable, volatile/non-volatile computer system storage media. In such instances, each may be connected to bus 90 by one or more data media interfaces. The memory 74 may include at least one program product having a set (e.g., at least one) of program modules that may be configured to carry out the functions of proposed embodiments. For example, the memory 74 may include a computer program product having a program executable by the processing unit 71 to cause the Input/Output (I/O) interface 72 to perform a method for contextualizing an abnormal event according to a proposed embodiment. Program/utility 78, having a set (at least one) of program modules 79, may be stored in memory 74. Program modules 79 may generally carry out the functions and/or methodologies of proposed embodiments for contextualizing an abnormal event.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Furthermore, computer system/server 70 may communicate with one or more networks such as a local area network (LAN), a general wide area network (WAN), and/or a public network (e.g., the Internet) via network adapter 73 (e.g. to communicate with a service mesh).

In the context of the present application, where embodiments of the present invention constitute a method, it should be understood that such a method is a process for execution by a computer, i.e. is a computer-implementable method. The steps of the method therefore reflect various parts of a computer program, e.g. parts of one or more algorithms.

Figure 7:
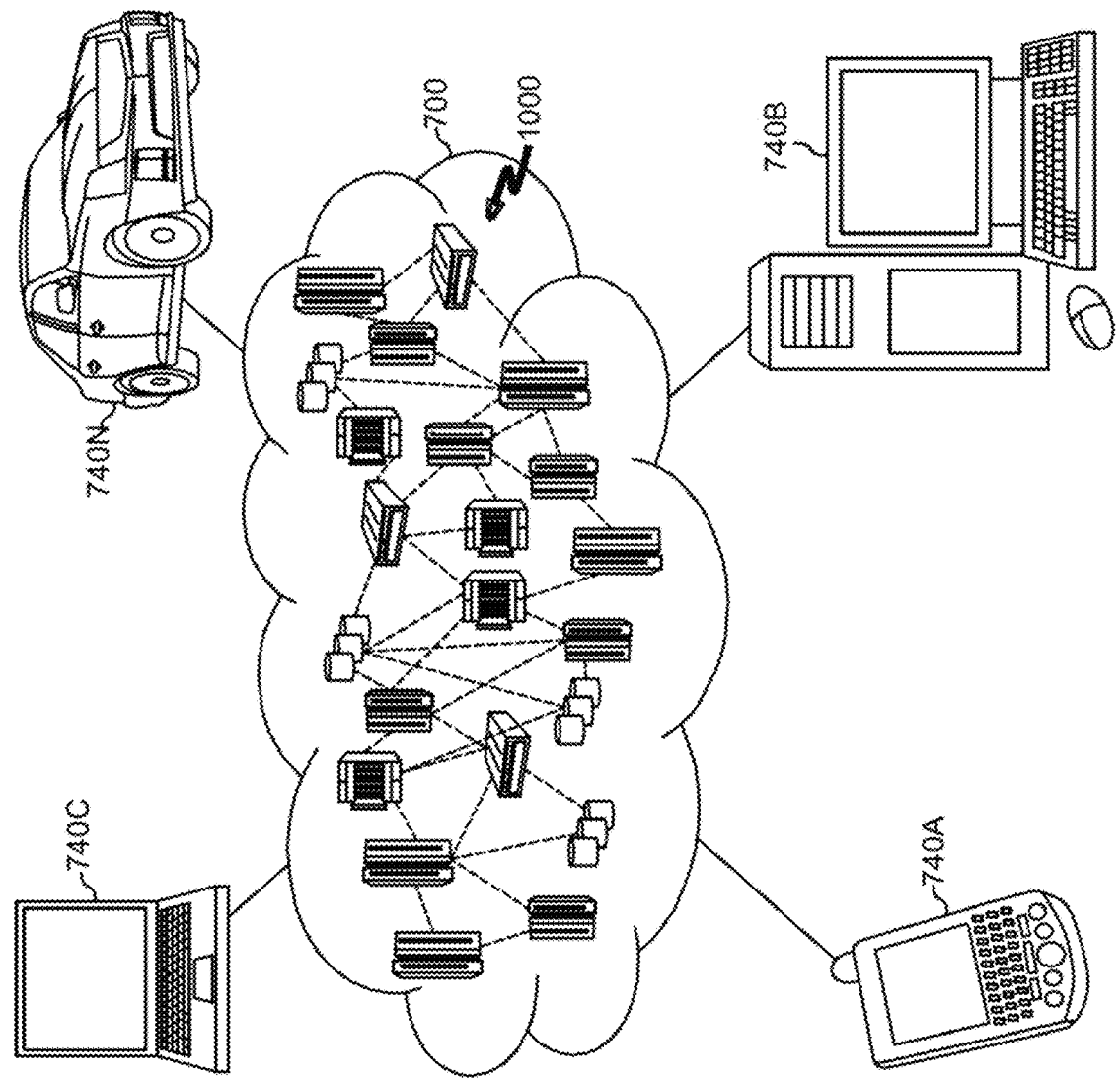
FIG. 7 depicts a cloud computing environment according to an embodiment of the present invention.

Referring now to FIG. 7, illustrative cloud computing environment 700 is depicted. As shown, cloud computing environment 700 may comprise one or more cloud computing nodes 1000 with which local computing devices used by cloud consumers, such as, for example, personal digital assistant (PDA) or cellular telephone 740A, desktop computer 740B, laptop computer 740C, and/or automobile computer system 740N may communicate. Nodes 1000 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 740A-N shown in FIG. 7 are intended to be illustrative only and that computing nodes 1000 and cloud computing environment 700 can communicate with any type of computerized device over any type of network and/or network addressable connection (e.g., using a web browser).

Figure 8:
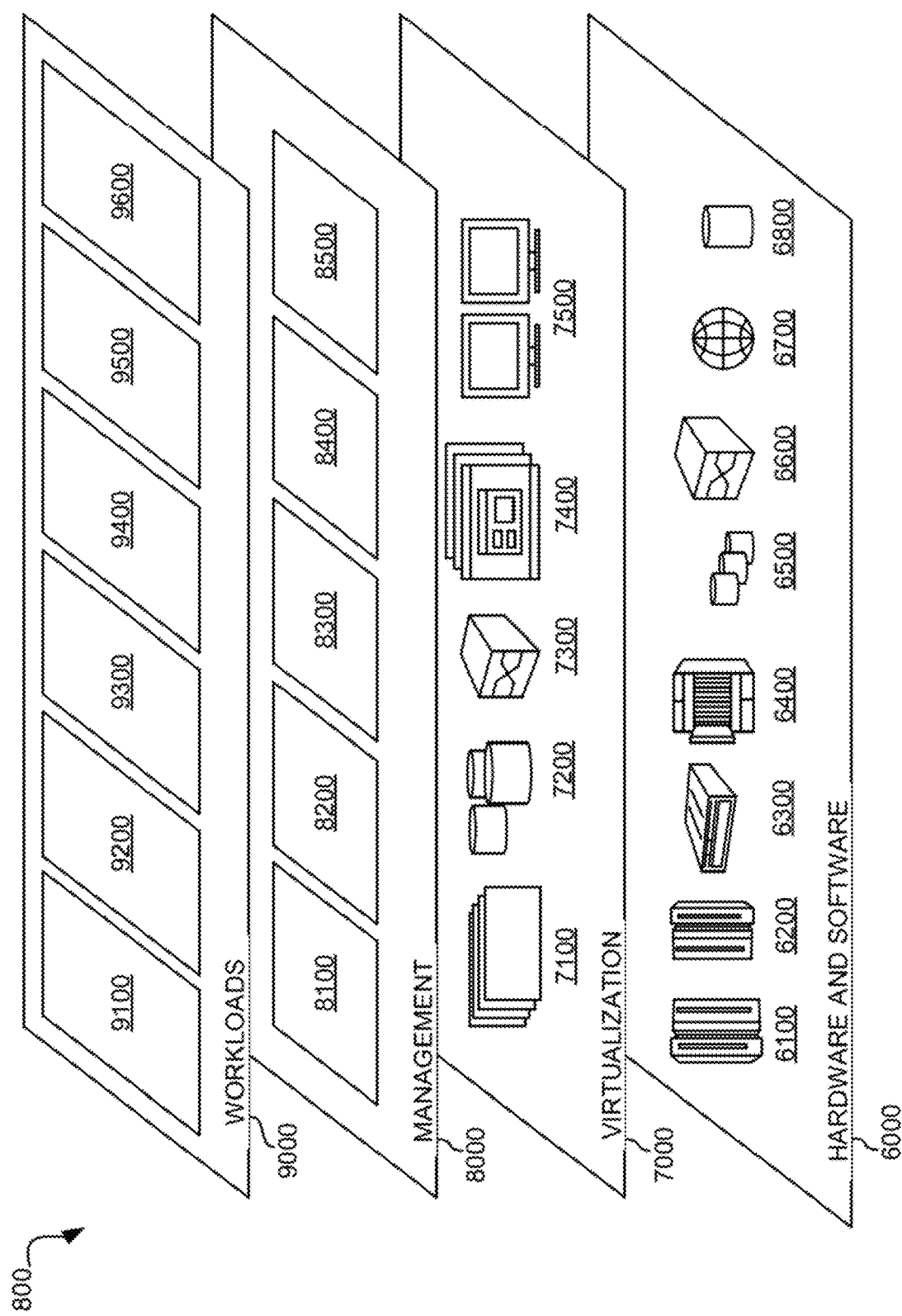
FIG. 8 depicts abstraction model layers according to an embodiment of the present invention.

Referring now to FIG. 8, a set of functional abstraction layers 800 provided by cloud computing environment 700 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 6000 may include hardware and software components. Examples of hardware components may include: mainframes 6100; RISC (Reduced Instruction Set Computer) architecture based servers 6200; servers 6300; blade servers 6400; storage devices 6500; and networks and networking components 6600. In some embodiments, software components may include network application server software 6700 and database software 6800.

Virtualization layer 7000 may provide an abstraction layer from which the following examples of virtual entities may be provided: virtual servers 7100; virtual storage 7200; virtual networks 7300, including virtual private networks; virtual applications and operating systems 7400; and virtual clients 7500.

In one example, management layer 8000 may provide the functions described below. Resource provisioning 8100 may provide dynamic procurement of computing resources and other resources that may be utilized to perform tasks within the cloud computing environment. Metering and Pricing 8200 may provide cost tracking as resources may be utilized within the cloud computing environment, and billing or invoicing for consumption of these resources. In one example, these resources may comprise application software licenses. Security may provide identity verification for cloud consumers and tasks, as well as protection for data and other resources. User portal 8300 may provide access to the cloud computing environment for consumers and system administrators. Service level management 8400 may provide cloud computing resource allocation and management such that required service levels may be met. Service Level Agreement (SLA) planning and fulfillment 8500 may provide pre-arrangement for, and procurement of, cloud computing resources for which a future requirement may be anticipated in accordance with an SLA.

Workloads layer 9000 may provide examples of functionality for which the cloud computing environment may be utilized. Examples of workloads and functions which may be provided from this layer may include: mapping and navigation 9100; software development and lifecycle management 9200; virtual classroom education delivery 9300; data analytics processing 9400; transaction processing 9500; and contextualizing abnormal events 9600. Contextualizing abnormal events 9600 may relate to identifying events or patterns that deviate from an expected behavior.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium may include the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device may receive computer readable program instructions from the network and may forward the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device may implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for contextualizing an abnormal event, the method comprising:
   detecting an occurrence of the abnormal event within a geographic region, the abnormal event occurring at an occurrence time;
   obtaining location-based social network (LBSN) data relating to the geographic region for a time period including the occurrence time, wherein the LBSN data at least includes a geotagged location of a user and an activity of the user at the geotagged location;
   analyzing the obtained LBSN data, wherein the analyzation determines a linked event within the geographic region for the time period;
   contextualizing the abnormal event by associating the linked event with the abnormal event, wherein the context is an event that was occurring at the time of the abnormal event;
   generating data for abnormal event classification, wherein the generating comprises:
      for each of a plurality of abnormal events within a geographic region, contextualizing the abnormal event by mapping an associated linked event to each abnormal event;
      for each of the plurality of abnormal events within the geographic region, storing the associated linked event mapped to each abnormal event;
   training an event classifier model with the stored associated linked event mapped to each abnormal event; and
   automatically associating, by the trained event classifier model, a future detected abnormal event with an event type without the LBSN data.

2. The method of claim 1, wherein detecting the occurrence of the abnormal event within the geographic region further comprises:
   obtaining metric data relating to a monitored metric of the geographic region; and
   processing the metric data with an anomaly detection algorithm to detect the occurrence of an abnormal event.

3. The method of claim 2, wherein processing the metric data with an anomaly detection algorithm to detect the occurrence of an abnormal event further comprises:
   determining, from the metric data, a first value of the monitored metric at first point in time;
   determining an expected value of the monitored metric at the first point in time; and
   detecting the occurrence of the abnormal event at the first point in time, based on the first and expected values of the monitored metric at the first point in time.

4. The method of claim 3, wherein determining an expected value of the monitored metric at the first point in time further comprises:
   calculating an expected value using at least one of:
      a time series forecasting model; and
      machine-learning model.

5. The method of claim 1, wherein obtaining LBSN data relating to the geographic region for a time period including the occurrence time further comprises:
   determining, based on the detected occurrence of an abnormal event, a time period including the occurrence time; and
   retrieving, from one or more databases, LBSN data relating to the geographic region for the determined time period.

6. The method of claim 1, wherein analyzing the obtained LBSN data further comprises:
   detecting one or more events within the geographic region based on the obtained LBSN data;
   determining a measure of relevance of each of the detected one or more events; and
   determining a linked event based on the determined measure of relevance for each of the detected one or more events.

7. The method of claim 6, wherein detecting one or more events within the geographic region based on the obtained LBSN data further comprises:
   processing the obtained LBSN data with a topic-modelling algorithm to identify popular topics for the time period;
   determining a measure of relevance of each of the popular topics; and
   determining one or more events based on the determined measure of relevance for each of the popular topics.

8. The method of claim 6, wherein determining a linked event further comprises, responsive to the determined measure of relevance for each of the detected one or more events not exceeding a predetermined threshold, determining that there is no linked event, and wherein the method further comprises:
   responsive to determining that there is no linked event, identifying that detected occurrence of an abnormal event is erroneous.

9. A computer program product for contextualizing an abnormal event, the computer program product comprising a computer readable storage medium having program instructions embodied therewith, the program instructions executable by a processing unit to cause the processing unit to perform a method comprising:
   detecting an occurrence of the abnormal event within a geographic region, the abnormal event occurring at an occurrence time;
   obtaining location-based social network (LBSN) data relating to the geographic region for a time period including the occurrence time, wherein the LBSN data at least includes a geotagged location of a user and an activity of the user at the geotagged location;
   analyzing the obtained LBSN data, wherein the analyzation determines a linked event within the geographic region for the time period;
   contextualizing the abnormal event by associating the linked event with the abnormal event, wherein the context is an event that was occurring at the time of the abnormal event;

generating data for abnormal event classification, wherein the generating comprises:
for each of a plurality of abnormal events within a geographic region, contextualizing the abnormal event by mapping an associated linked event to each abnormal event;
for each of the plurality of abnormal events within the geographic region, storing the associated linked event mapped to each abnormal event;
training an event classifier model with the stored associated linked event mapped to each abnormal event; and
automatically associating, by the trained event classifier model, a future detected abnormal event with an event type without the LBSN data.

10. The computer program product of claim 9, further comprising:
at least one processor, wherein the at least one processor is adapted to execute the program instructions of the computer program product.

11. A computer system for contextualizing an abnormal event, the system comprising:
a detection component configured to detect an occurrence of the abnormal event within a geographic region, the abnormal event occurring at an occurrence time;
an interface component configured to obtain location-based social network (LBSN) data relating to the geographic region for a time period including the occurrence time, wherein the LBSN data at least includes a geotagged location of a user and an activity of the user at the geotagged location;
a data analysis component configured to analyze the obtained LBSN data, wherein the analyzation determines a linked event within the geographic region for the time period;
a mapping component configured to contextualize the abnormal event by associating the linked event with the abnormal event, wherein the context is an event that was occurring at the time of the abnormal event;
a generating component configured to generate data for abnormal event classification, wherein the generating comprises:
for each of a plurality of abnormal events within a geographic region, contextualizing the abnormal event by mapping an associated linked event to each abnormal event;
for each of the plurality of abnormal events within the geographic region, storing the associated linked event mapped to each abnormal event;
a training component configured to train an event classifier model with the stored associated linked event mapped to each abnormal event; and
an association component configured to automatically associate, by the trained event classifier model, a future detected abnormal event with an event type without the LBSN data.

12. The computer system of claim 11, wherein the detection component further comprises:
an input interface configured to obtain metric data relating to a monitored metric of the geographic region; and
a processing unit configured to process the metric data with an anomaly detection algorithm to detect the occurrence of the abnormal event.

13. The computer system of claim 11, wherein the interface component is further configured to:
determine, based on the detected occurrence of an abnormal event, a time period including the occurrence time; and
retrieve, from one or more databases, LBSN data relating to the geographic region for the determined time period.

14. The computer system of claim 11, wherein the data analysis component is further configured to:
detect one or more events within the geographic region based on the obtained LBSN data;
determine a measure of relevance of each of the detected one or more events; and
determine a linked event based on the determined measure of relevance for each of the detected one or more events.

15. The computer system of claim 14, wherein detecting one or more events within the geographic region based on the obtained LBSN data further comprises:
processing the obtained LBSN data with a topic-modelling algorithm to identify popular topics for the time period;
determining a measure of relevance of each of the popular topics; and
determining the one or more events based on the determined measure of relevance for each of the popular topics.

16. The computer system of claim 14, wherein determining the linked event further comprises, responsive to the determined measure of relevance for each of the detected one or more events not exceeding a predetermined threshold, determining that there is no linked event, and wherein the method further comprises:
responsive to determining that there is no linked event, identifying that the detected occurrence of the abnormal event is erroneous.

* * * * *